(12) United States Patent
Mueller et al.

(10) Patent No.: US 9,960,848 B2
(45) Date of Patent: May 1, 2018

(54) COMMISSIONING OF DEVICES ON A LIGHTING COMMUNICATIONS NETWORK

(71) Applicant: Xicato, Inc., San Jose, CA (US)

(72) Inventors: Martin Emil Mueller, Fremont, CA (US); Barry Mark Loveridge, San Jose, CA (US); Jeffrey P. Hushley, Honolulu, HI (US); Gerard Harbers, Sunnyvale, CA (US)

(73) Assignee: Xicato, Inc., San Jose, CA (US)

( * ) Notice: Subject to any disclaimer, the term of this patent is extended or adjusted under 35 U.S.C. 154(b) by 0 days. days.

(21) Appl. No.: 15/399,508

(22) Filed: Jan. 5, 2017

(65) Prior Publication Data
US 2017/0117963 A1    Apr. 27, 2017

Related U.S. Application Data

(63) Continuation-in-part of application No. 15/055,413, filed on Feb. 26, 2016, now Pat. No. 9,853,730.
(Continued)

(51) Int. Cl.
*H04B 10/116* (2013.01)
*H04L 29/06* (2006.01)
(Continued)

(52) U.S. Cl.
CPC ............ *H04B 10/116* (2013.01); *H04L 63/08* (2013.01); *H04L 63/18* (2013.01); *H04W 12/06* (2013.01);
(Continued)

(58) Field of Classification Search
CPC .. H04B 10/116; H05B 33/08; H05B 33/0803; H05B 33/0869; H05B 37/0272; H04L 63/08; H04L 63/18; H04W 12/06
See application file for complete search history.

(56) References Cited

U.S. PATENT DOCUMENTS 5,959,316 A    9/1999 Lowery
6,351,069 B1   2/2002 Lowery et al.
(Continued)

FOREIGN PATENT DOCUMENTS

WO    WO2010069034 A1    6/2010

OTHER PUBLICATIONS

International Search Report and Written Opinion dated May 30, 2016 for International Application No. PCT/US2016/020057 filed on Feb. 29, 2016 by Xicato, Inc., 16 pages.
(Continued)

*Primary Examiner* — Ted Wang
(74) *Attorney, Agent, or Firm* — Silicon Valley Patent Group LLP

(57) ABSTRACT

Light Emitting Diode (LED) based illumination devices in a lighting communications network may be commissioned into a group with a mobile electronics device, such as a mobile phone, tablet computer, etc. The identities of a plurality of LED illumination devices are determined and a request is communicated to the identified LED based illumination devices to modulate emitted light for a period of time. The modulated light is detected by the mobile electronics device, which may then determine a group of the LED based illumination devices. For example, the detected intensity of the modulated light may be used to determine the group. In another example, the physical locations of the LED based illumination devices are determined by detecting a sequence of images (e.g., video) of the modulated light, and the group may be determined based on the locations of the LED based illumination devices.

18 Claims, 14 Drawing Sheets

Related U.S. Application Data

(60) Provisional application No. 62/126,341, filed on Feb. 27, 2015, provisional application No. 62/275,115, filed on Jan. 5, 2016, provisional application No. 62/275,158, filed on Jan. 5, 2016.

(51) Int. Cl.
   *H04W 12/06* (2009.01)
   *H05B 37/02* (2006.01)
   *H05B 33/08* (2006.01)

(52) U.S. Cl.
   CPC ..... *H05B 33/0869* (2013.01); *H05B 37/0272* (2013.01); *H05B 33/0803* (2013.01)

(56) References Cited

U.S. PATENT DOCUMENTS

| | | |
|---|---|---|
| 6,504,301 B1 | 1/2003 | Lowery |
| 6,586,882 B1 | 7/2003 | Harbers |
| 6,600,175 B1 | 7/2003 | Baretz et al. |
| 6,680,569 B2 | 1/2004 | Mueller-Mach et al. |
| 6,812,500 B2 | 11/2004 | Reeh et al. |
| 7,126,162 B2 | 10/2006 | Reeh et al. |
| 7,250,715 B2 | 7/2007 | Mueller et al. |
| 7,479,662 B2 | 1/2009 | Soules et al. |
| 7,564,180 B2 | 7/2009 | Brandes |
| 7,614,759 B2 | 11/2009 | Negley |
| 7,629,621 B2 | 12/2009 | Reeh et al. |
| 2007/0081336 A1 | 4/2007 | Bierhuizen et al. |
| 2012/0001567 A1 | 1/2012 | Knapp et al. |
| 2013/0026941 A1 | 1/2013 | Ganick et al. |
| 2013/0234607 A1* | 9/2013 | Kim ............... H05B 33/0854 315/158 |
| 2014/0028200 A1 | 1/2014 | Van Wagoner et al. |
| 2016/0254864 A1 | 9/2016 | Mueller et al. |

OTHER PUBLICATIONS

Pujapanda, K. (Apr. 6, 2013). "Li-fi integrated to power-lines for smart illumination cum communication," Communication Systems and Network Technologies, *IEEE*, p. 875-878.

Sawers, P. (Dec. 31, 2011). "Li-fi: access the internet through LED bulbs," located at URL:http://thenextweb.com/insider/ 2014/08/.

* cited by examiner

COMMISSIONING OF DEVICES ON A LIGHTING COMMUNICATIONS NETWORK

CROSS REFERENCE TO RELATED APPLICATIONS

This application is a continuation-in-part of U.S. application Ser. No. 15/055,413, filed Feb. 26, 2016, which, in turn, claims priority under 35 USC 119 to U.S. Provisional Application No. 62/126,341, filed Feb. 27, 2015, and to U.S. Provisional Application No. 62/275,115, filed Jan. 5, 2016, all of which are incorporated by reference herein in their entireties. This application also claims priority under 35 USC 119 to U.S. Provisional Application No. 62/275,158, filed Jan. 5, 2016, which is incorporated by reference herein in its entirety.

TECHNICAL FIELD

The described embodiments relate to illumination modules that include Light Emitting Diodes (LEDs).

BACKGROUND

The use of LEDs in general lighting is becoming more desirable and prevalent. Typically, LED illumination devices are standalone units. It is desirable, however, to be able to communicate between devices and with external devices.

SUMMARY

Light Emitting Diode (LED) based illumination devices in a lighting communications network may be commissioned into a group with a mobile electronics device, such as a mobile phone, tablet computer, etc. The identities of a plurality of LED illumination devices are determined and a request is communicated to the identified LED based illumination devices to modulate emitted light for a period of time. The modulated light is detected by the mobile electronics device, which may then determine a group of the LED based illumination devices. For example, the detected intensity of the modulated light may be used to determine the group. In another example, the physical locations of the LED based illumination devices are determined by detecting a sequence of images (e.g., video) of the modulated light, and the group may be determined based on the locations of the LED based illumination devices.

In one implementation, a method of grouping LED based illumination sources on a lighting communications network includes determining a plurality of identities, each associated with a different LED based illumination device on the lighting communications network; communicating a request to each identified LED based illumination device to modulate a light emitted from each of the LED based illumination devices for a period of time; detecting the modulated light emitted from each LED based illumination device; and determining a group of the LED based illumination devices based on the detected modulated light and the identities of the LED based illumination devices.

In one implementation, a mobile electronic device includes a radio frequency transceiver; a light detector; and one or more processors configured to determine a plurality of identities, each associated with a different LED based illumination device on a lighting communications network, based on one or more signals received by the radio frequency transceiver; communicate a request to each identified LED based illumination device with the radio frequency transceiver to modulate a light emitted from each of the LED based illumination devices for a period of time; detect with the light detector the modulated light emitted from each LED based illumination device; and determine a group of the LED based illumination devices based on the detected modulated light and the identities of the LED based illumination devices.

DETAILED DESCRIPTION

Reference will now be made in detail to background examples and some embodiments of the invention, examples of which are illustrated in the accompanying drawings.

Figure 1:
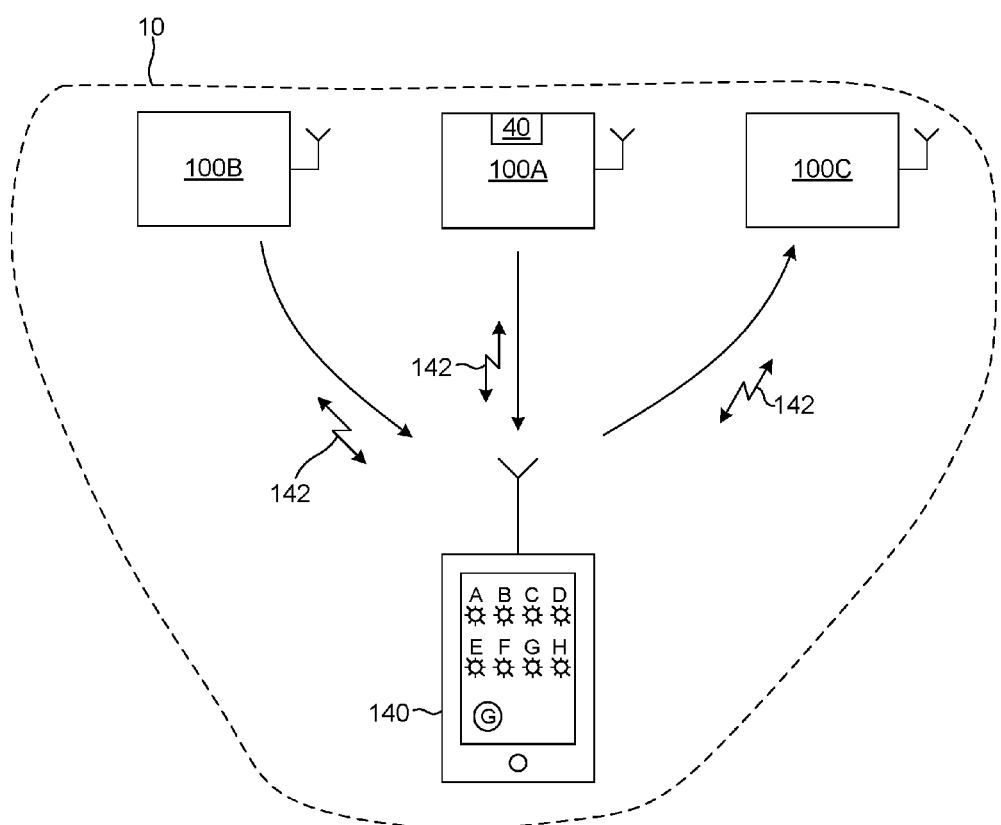
FIG. 1 depicts a lighting control and information system including a lighting control network.

FIG. 1 depicts a lighting control and information system including a lighting control network 10 in an exemplary, non-limiting embodiment. Lighting control network 10 is configured as a wireless network (e.g., Bluetooth Low Energy (BLE), etc.) that includes LED based illumination devices 100A-C and a lighting control device such as a mobile electronic device 140 (e.g., mobile phone, tablet computer, etc.). In some other embodiments, lighting control network 10 includes a number of LED based illumination devices and other peripheral devices such as one or more switches, occupancy sensors, etc., configured as a wireless network (e.g., BLE, etc.) In some other embodiments, lighting control network 10 includes a lighting control and communications gateway (LCCG) 40 depicted in FIG. 3.

Figure 2:
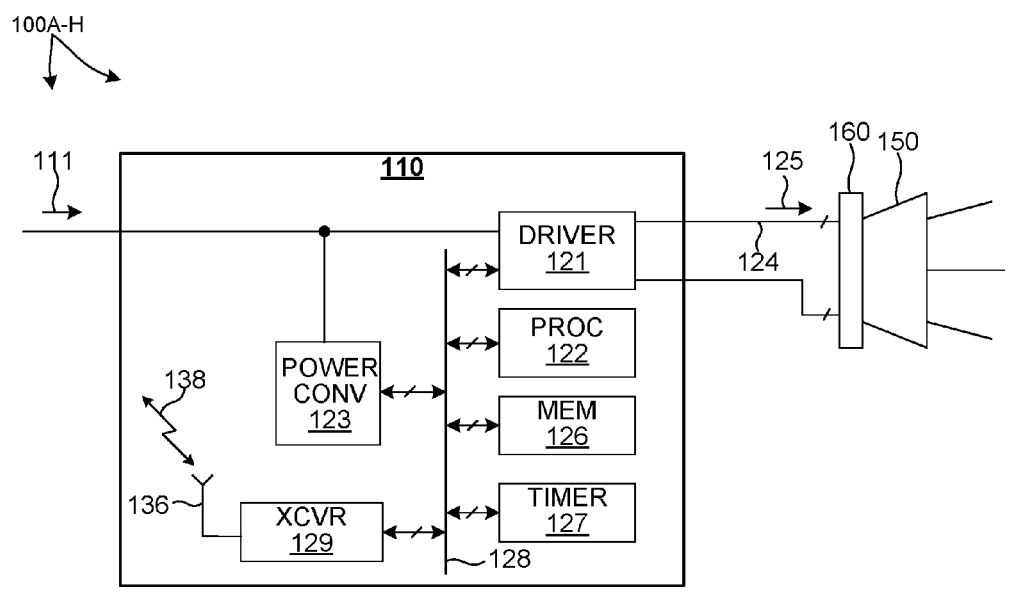
FIG. 2 depicts an exemplary LED based illumination device that includes a Light Control and Data Interface Module (LCDIM) configured to supply electrical power to an LED based light engine.
Figure 3:
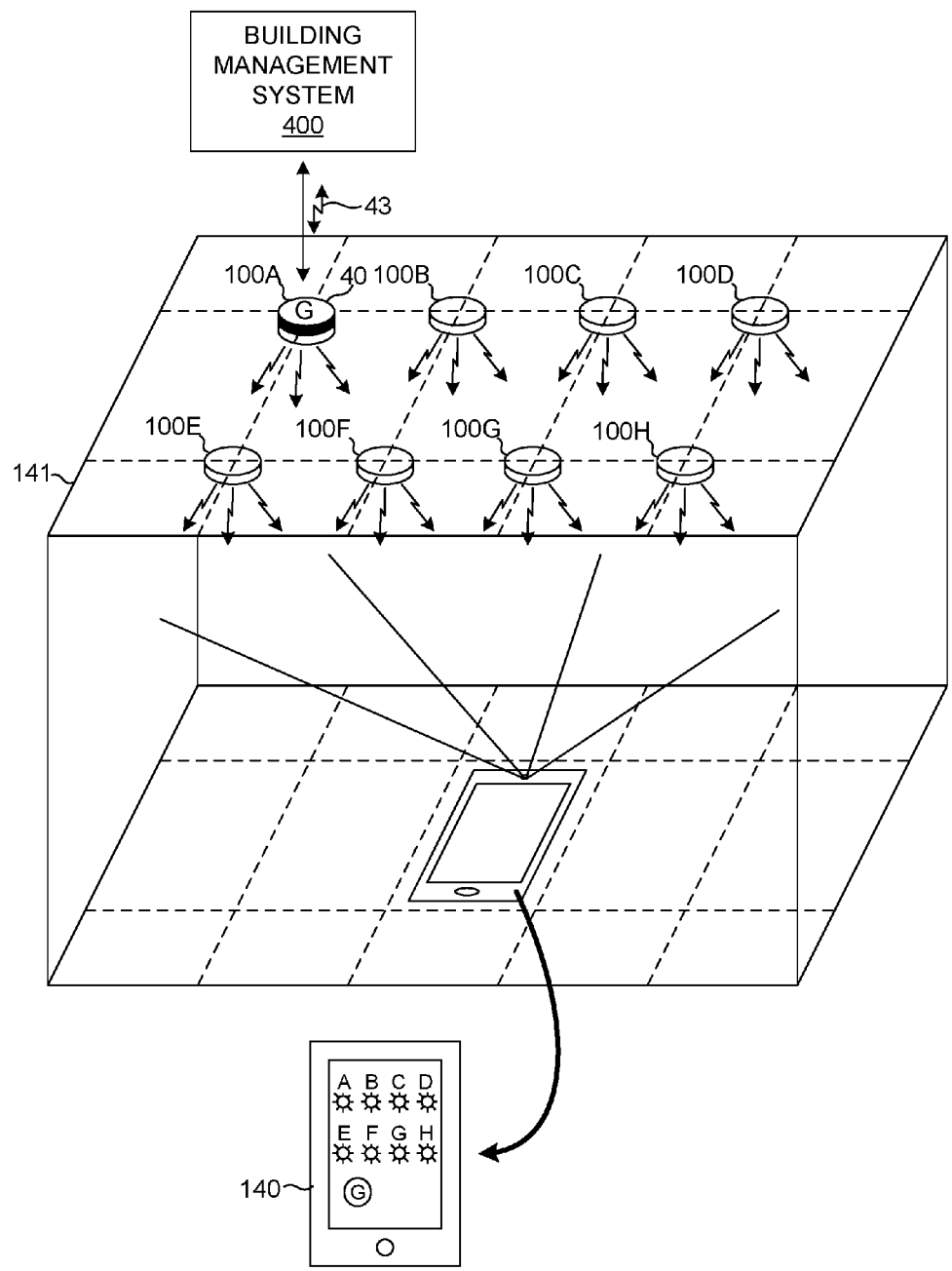
FIG. 3 depicts an environment illuminated by a plurality of LED based illumination device.

FIG. 2 depicts an exemplary LED based illumination device such as any of LED based illumination devices 100A-C depicted in FIG. 1 and LED based illumination devices 100A-H depicted in FIG. 3. LED based illumination devices 100A-H includes a Light Control and Data Interface Module (LCDIM) 110 configured to supply electrical power to an LED based light engine 160, shown with reflector 150. In addition, LCDIM 110 also integrates light control, power conversion, data acquisition, data processing, and communication capability. In the embodiment depicted in FIG. 2, LCDIM 110 includes an LED driver 121, a power converter 123, a radio frequency transceiver 129 configured to communicate signals 138 with other devices on the lighting control network 10, a radio frequency transceiver 129, a processor 122, a memory 126, and a timer 127 configured to communicate over bus 128.

The ability to achieve high speed data communications among LED based illumination devices on the lighting control network enables additional, data intensive functionality to be added to the LED based illumination devices.

In some examples, a LED based illumination device on the lighting control network includes a wireless communications device. In one example, the wireless communications device is a short range radio subsystem that complies with the IEEE 802.15.4 standard. In another example, the wireless communications device is a radio subsystem that complies with the Bluetooth Low Energy standard. The wireless communications device is configured to transmit or receive an amount of data from a device that is external to the lighting control network (e.g., a sensor such as a camera, an occupancy sensor, an environmental sensor, a switch, etc.). Data communicated between this device and the LED based illumination device may be used to control the LED based illumination devices on the lighting control network.

FIG. 3 depicts an environment 141 illuminated by LED based illumination devices 100A-H. In addition, LED based illumination device 100A includes a LCCG 40 to bridge communications between a lighting control network and a building management network. The lighting control network includes LED based illumination devices 100A-H and mobile electronics device 140. The building management network includes LED based illumination device 100A and building management system 400. Mobile electronics device 140 (e.g., mobile phone, tablet computer, etc.) includes a camera module and associated software to identify the presence of LED based illumination devices 100A-H including LCCG 40 within environment 141.

In one example, it may be desirable to group LED based illumination devices 100A-H and control the light emitted from the LED based illumination device 100A-H based on triggering events.

In one aspect, mobile electronics device 140 is configured to generate and communicate instructions to LED based illumination devices 100A-H that define light control rules that govern the response of each of the LED based illumination devices 100A-H.

As depicted in FIG. 1, mobile electronic device 140 broadcasts signal 142. In some embodiments, signal 142 also includes an indication of the identities of each of the LED based illumination devices participating in the group (e.g., LED based illumination devices 100A-H), and at least one lighting control rule. The lighting control rule includes at least one parameter that defines at least a portion of the light control response of each LED based illumination device. By way of non-limiting example, a parameter defining at least a portion of the light control response may include any of a fade rate, a target intensity level, and a persistence time.

Signal 142 may not directly reach all of the LED based lighting control devices. In these examples, some LED based illumination devices receive and rebroadcast signal 142. In this manner, all LED based illumination devices in a group receive the programming information contained in signal 142.

Each of the LED based illumination devices compare their own identities (e.g., physical address, logical address, etc.) with the target identities included in signal 142. If there is match, the LED based illumination device writes the sensor identity and light control rule(s) to their respective memories (e.g., memory 126 depicted in FIG. 2). In this manner, each LED based illumination device is configured to respond to control communications and respond in accordance with the programmed light control rules. In this manner, a mobile communication device may be employed to flexibly program groups of LED based illumination devices to respond in a synchronized manner.

Although programming information may be communicated to one or more LED based illumination devices by a mobile electronic device, in general, any suitable electronic device (e.g., building management server, networked computer, etc.) may be employed to communicate programming information.

In some embodiments, the wireless communications protocol associated with the lighting control network 10 is based on the BLE standard. Such a network is localized and is compatible with many mobile electronic devices 140. A number of lighting control and data collection functions such as commissioning, configuration of groups, control parameter selection, indoor location services, etc., are coordinated by mobile electronics device 140 on the lighting control network 10.

In one aspect, a request by a mobile electronics device to establish a communications link on an RF based communications network is optically authenticated by an LED based illumination device.

Figure 4:
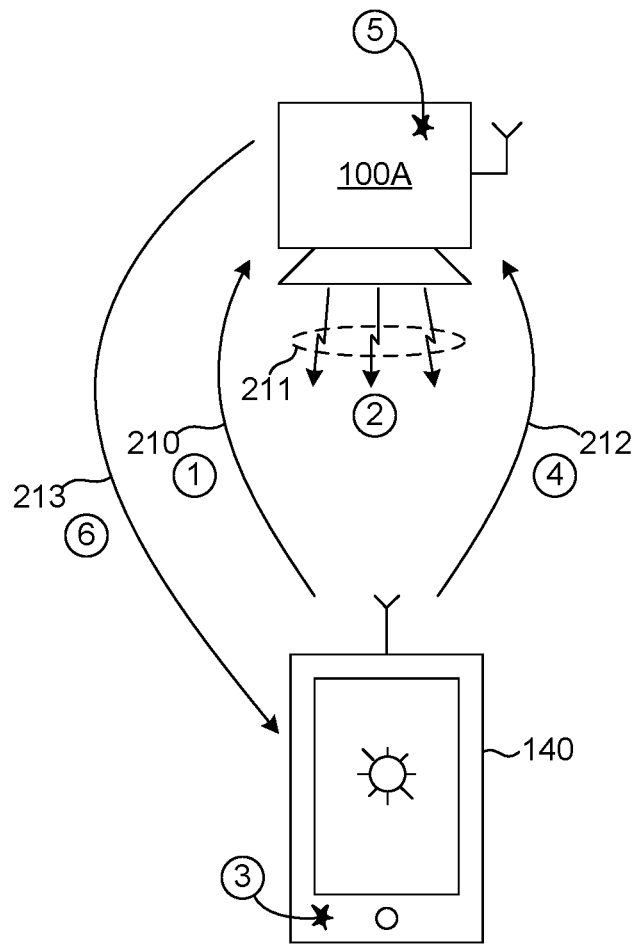
FIG. 4 depicts an LED based illumination device that authenticates a mobile electronics device in one exemplary embodiment.

FIG. 4 depicts a LED based illumination device 100A that authenticates a mobile electronics device 140 in one exemplary embodiment. In a step 1, a wireless communications message 210 is communicated from mobile electronic device 140 to LED based illumination device 100A. Message 210 requests that a communications link be established between mobile electronics device 140 and LED based illumination device 100A. In a step 2, LED based illumination device 100A modulates an amount of light 211 emitted from LED based illumination device 100A in a manner that communicates an optical code from LED based illumination device 100A. In a step 3, mobile electronics device 140 detects a portion of the modulated light 211 emitted from LED based illumination device 100A by a camera, or other light sensor on board mobile electronics device 140. In addition, the optical code embedded in the captured light is determined, for example, by a processor on board mobile electronics device 140. In a step 4, a wireless communications message 212 is communicated from mobile electronic device 140 to LED based illumination device 100A. Message 212 includes an indication of the optical code determined by the processor of mobile electronics device 140. In a step 5, LED based illumination device 100A determines whether there is a match between the optical code communicated by emitted light 211 and the indication of the optical code received from mobile electronics device 140. The determination is made, for example, by processor 122 of LCDIM 110 of LED based illumination device 100A. If there is a match, in a step 6, LED based illumination device 100A wirelessly communicates a message 213 to mobile electronics device 140. Message 213 includes an indication that LED based illumination device 100A is establishing a communications link between mobile electronics device 140 and LED based illumination device 100A.

In another aspect, the presence of a mobile electronics device in close proximity to a point of sale (POS) terminal is verified by an LED based illumination device.

Figure 5:
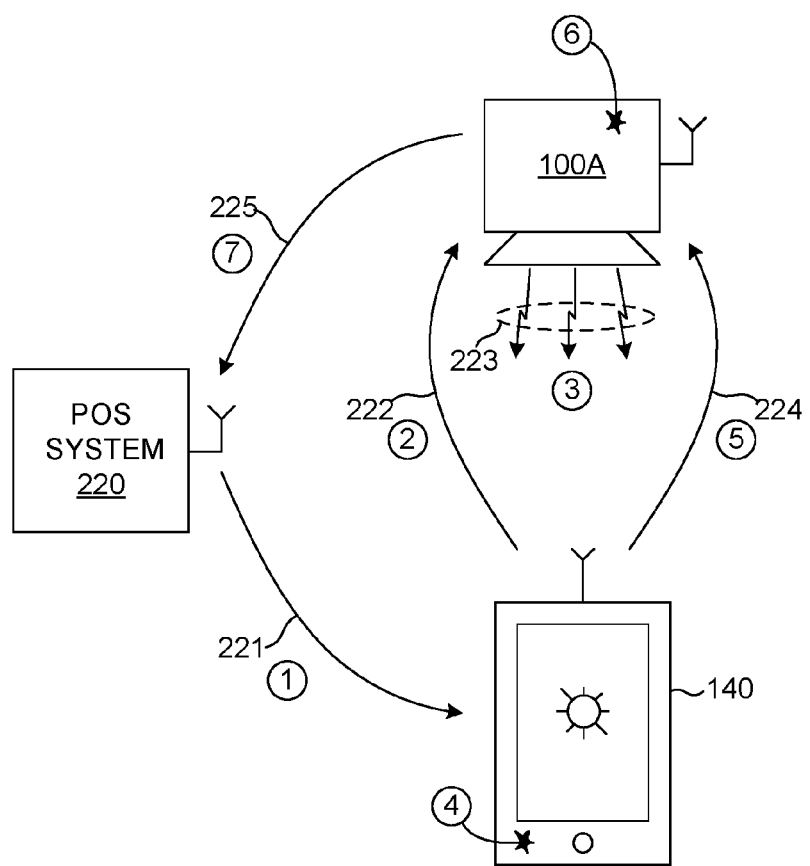
FIG. 5 depicts a point of sale (POS) system and an LED based illumination device that verifies the proximity of mobile electronics device with respect to the POS system in one exemplary embodiment.

FIG. 5 depicts a POS system 220 and an LED based illumination device 100A that verifies the proximity of mobile electronics device 140 with respect to the POS system 220 in one exemplary embodiment. In a step 1, a POS system 220 communicates a wireless communications message 221 to mobile electronics device 140. Message 221 includes a request that mobile electronics device 140 initiate a verification of its proximity to POS system 220 with LED based illumination device 100A. In a step 2, wireless communications message 222 is communicated from mobile electronic device 140 to LED based illumination device 100A. Message 222 requests that LED based illumination device 100A verify the proximity of mobile electronics device 140 to LED based illumination device 100A located in close proximity to POS system 220. In a step 3, LED based illumination device 100A modulates an amount of light 223 emitted from LED based illumination device 100A in a manner that communicates an optical code from LED based illumination device 100A. In a step 4, mobile electronics device 140 detects a portion of the modulated light 223 emitted from LED based illumination device 100A by a camera, or other light sensor on board mobile electronics device 140. In addition, the optical code embedded in the captured light is determined, for example, by a processor on board mobile electronics device 140. In a step 5, a wireless communications message 224 is communicated from mobile electronic device 140 to LED based illumination device 100A. Message 224 includes an indication of the optical code determined by the processor of mobile electronics device 140. In a step 6, LED based illumination device 100A determines whether there is a match between the optical code communicated by emitted light 223 and the indication of the optical code received from mobile electronics device 140. The determination is made, for example, by processor 122 of LCDIM 110 of LED based illumination device 100A. If there is a match, in a step 7, LED based illumination device 100A wirelessly communicates a message 225 to POS system 220. Message 225 includes an indication that mobile electronics device 140 is in close proximity to a POS terminal of POS system 220.

In some examples, multiple LED based illumination devices in close proximity to a POS terminal of POS system 220 are employed to sequentially transmit optical codes. In these examples, mobile electronics device 140, not only returns an indication of the optical codes, but also an indication of the strength of the optical signal detected by the mobile electronics device 140. Based on the strength of signal information, a processor of one or more of the LED based illumination devices determines the location of mobile electronics device 140 relative to POS system 220. A more accurate estimate of relative position is achieved based on return signals (e.g., signal 224 received by multiple LED based illumination devices In this example, one or more LED based illumination devices are employed to provide an estimate of the proximity of a mobile electronics device to a POS system. However, in general, one or more LED based illumination devices may be employed to provide an estimate of the proximity of a mobile electronics device to any system (e.g., physical security system) in the manner described herein.

In yet another aspect, a mobile electronics device obtains the identity of an LED based illumination device and communicates security codes to the LED based illumination device. In some embodiments, the security codes are obtained from a license server based on the identity of the LED based illumination device.

Figure 6:
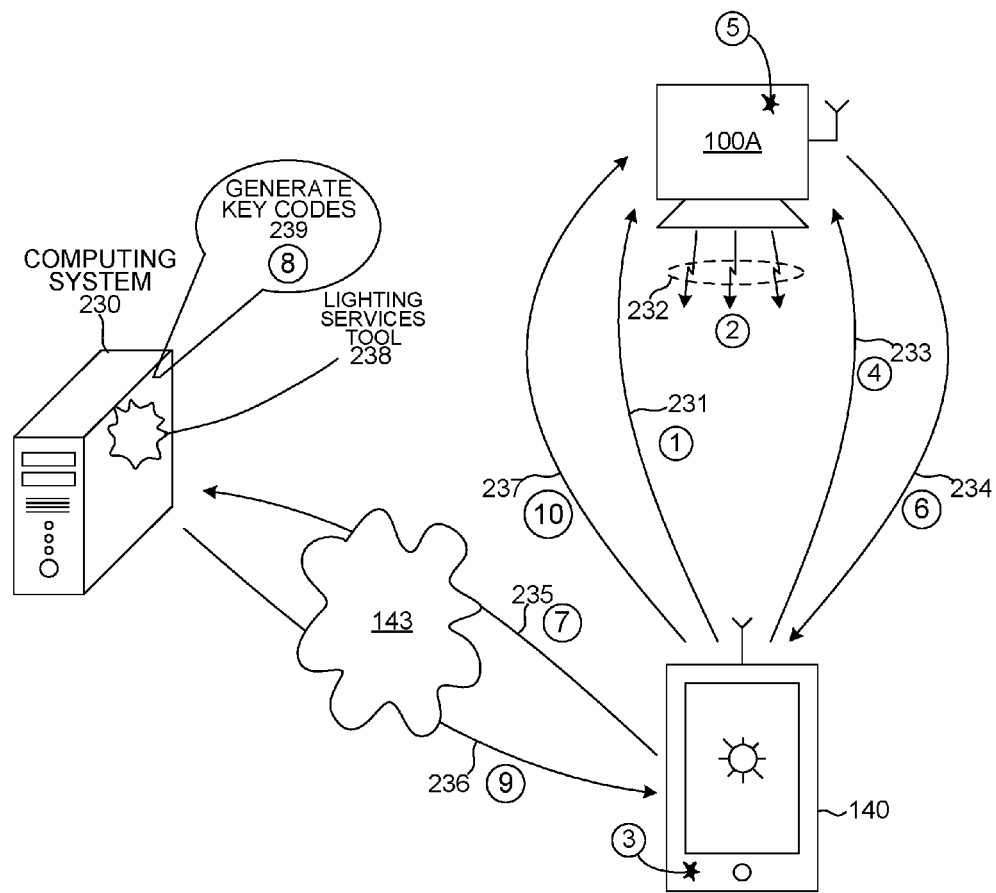
FIG. 6 depicts an LED based illumination device, a mobile electronics device, and a computing system that is communicatively linked to mobile communications device over the internet.

FIG. 6 depicts an LED based illumination device 100A, a mobile electronics device 140, and a computing system 230 that is communicatively linked to mobile communications device 140 over the internet 143. In a step 1, wireless communications message 231 is communicated from mobile electronic device 140 to LED based illumination device 100A. Message 231 requests that LED based illumination device 100A communicate an indication of its identity (e.g., serial number, BLE device key, etc.). In a step 2, LED based illumination device 100A modulates an amount of light 232 emitted from LED based illumination device 100A in a manner that communicates an optical code from LED based illumination device 100A. In a step 3, mobile electronics device 140 detects a portion of the modulated light 232 emitted from LED based illumination device 100A by a camera, or other light sensor on board mobile electronics device 140. In addition, the optical code embedded in the captured light is determined, for example, by a processor on board mobile electronics device 140. In a step 4, a wireless communications message 233 is communicated from mobile electronic device 140 to LED based illumination device 100A. Message 233 includes an indication of the optical code determined by the processor of mobile electronics device 140. In a step 5, LED based illumination device 100A determines whether there is a match between the optical code communicated by emitted light 233 and the indication of the optical code received from mobile electronics device 140. The determination is made, for example, by processor 122 of LCDIM 110 of LED based illumination device 100A. If there is a match, in a step 6, LED based illumination device 100A wirelessly communicates a message 234 to mobile electronics device 140. Message 234 includes an indication of an identity of LED based illumination device 100A. In a step 7, mobile electronics device 140 communicates a message 235 to computing system 230. Message 235 includes the indication of the identity of LED based illumination device 100A. In addition, message 235, or another separate message, includes a request that computing system 230 provide security key codes to enable particular functionality of LED based illumination device 100A. In response, in a step 8, lighting services tool 238 running on one more processors of computing system 230 generates one or more security key codes 239. In a step 9, message 236 is communicated from computing system 230 to mobile electronics device 140. Message 236 includes an indication of the security key codes generated by computing system 230 based on the identity of LED based illumination device 100A. In a step 10, mobile electronics device 140 communicates a wireless message 237 to LED based illumination device 100A. Message 237 includes an indication of the security codes generated by computing system 230. In some examples, the security codes include any of a device code to unlock basic operational functionality of LED based lighting device 100A, a network code that allows LED based illumination device 100A to connect to a lighting control network (e.g., lighting control network 10), and an application code to enable application services to run on LED based illumination device 100A. Exemplary application services include data acquisition and analysis functions, lighting control functions, etc.

In some examples, the generation of security key codes by computing system 230 is contingent on additional communications between mobile electronics device 140 and computing system 230. For example, authentication of mobile electronics device 140 may be required. In another example, a financial transaction enabled by communication between mobile electronics device 140 and computing system 230 may be required before security keys are generated.

In some other embodiments, the security codes are obtained from a building management system based on the identity of the LED based illumination device.

Figure 7:
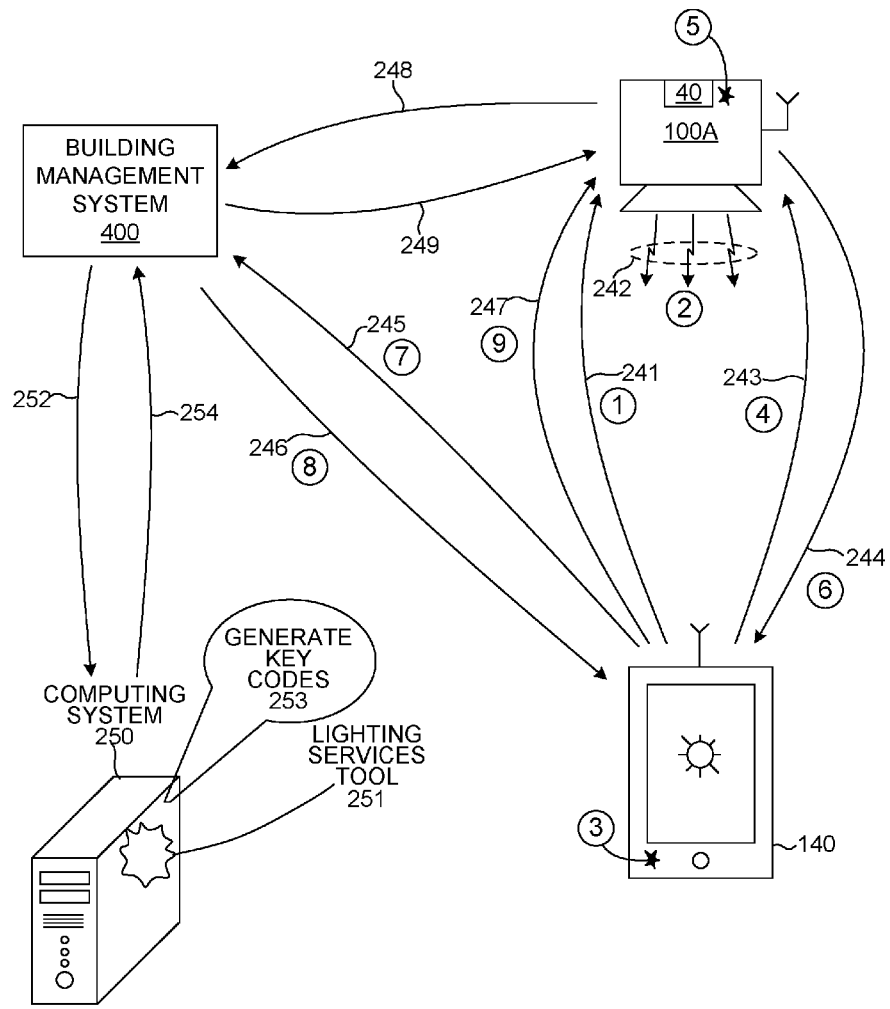
FIG. 7 depicts an LED based illumination device, a mobile electronics device, and a building management system that is communicatively linked to a mobile communications device.

FIG. 7 depicts an LED based illumination device 100A, a mobile electronics device 140, and a building management system 400 that is communicatively linked to mobile communications device 140. In a step 1, wireless communications message 241 is communicated from mobile electronic device 140 to LED based illumination device 100A. Message 241 requests that LED based illumination device 100A communicate an indication of its identity (e.g., serial number, BLE device key, etc.). In a step 2, LED based illumination device 100A modulates an amount of light 242 emitted from LED based illumination device 100A in a manner that communicates an optical code from LED based illumination device 100A. In a step 3, mobile electronics device 140 detects a portion of the modulated light 242 emitted from LED based illumination device 100A by a camera, or other light sensor on board mobile electronics device 140. In addition, the optical code embedded in the captured light is determined, for example, by a processor on board mobile electronics device 140. In a step 4, a wireless communications message 243 is communicated from mobile electronic device 140 to LED based illumination device 100A. Message 243 includes an indication of the optical code determined by the processor of mobile electronics device 140. In a step 5, LED based illumination device 100A determines whether there is a match between the optical code communicated by emitted light 243 and the indication of the optical code received from mobile electronics device 140. The determination is made, for example, by processor 122 of LCDIM 110 of LED based illumination device 100A. If there is a match, in a step 6, LED based illumination device 100A wirelessly communicates a message 244 to mobile electronics device 140. Message 244 includes an indication of an identity of LED based illumination device 100A. In a step 7, mobile electronics device 140 communicates a message 245 to building management system 400. Message 245 includes the indication of the identity of LED based illumination device 100A. In addition, message 245, or another separate message, includes a request that building management system 400 provide security key codes to enable particular functionality of LED based illumination device 100A. In response, in a step 8, building management system 400 communicates a message 246 to mobile electronics device 140. Message 246 includes an indication of one or more security key codes identified by the building management system 400 based on the identity of LED based illumination device 100A. In a step 9, message 247 is communicated from mobile electronics device 140 to LED based illumination device 100A. Message 247 includes an indication of the security key codes communicated by the building management system 400 based on the identity of LED based illumination device 100A.

In some examples, the security codes include any of a device code to unlock basic operational functionality of LED based illumination device 100A, a network code that allows LED based illumination device 100A to connect to a lighting control network (e.g., lighting control network 10), and an application code to enable application services to run on LED based illumination device 100A. Exemplary application services include data acquisition and analysis functions, lighting control functions, etc. In one example, message 247 includes an indication of a network code. LED based illumination device 100A transmits a message 248 to building management system 400 requesting that LED based illumination device 100A be added to a building management network. In addition, message 248, or a separate message, includes an indication of the network key received from the mobile electronics device 140. In response, building management system 400 sends message 249 to LED based illumination device 100A indicating that LED based illumination device 100A has been added to a building management network.

In another example, LED based illumination device 100A transmits a message to another LED based illumination device requesting that LED based illumination device 100A be added to a lighting control network. In addition, the message, or a separate message, includes an indication of the network key received from the mobile electronics device 140. In response, LED based illumination device 100A is added to the lighting control network.

In addition, building management system 400 communicates a message 252 to computing system 250 requesting that computing system 250 provide security key codes to enable particular functionality of various LED based illumination devices. In response, lighting services tool 251 running on one more processors of computing system 250 generates one or more security key codes 253. Message 254 is communicated from computing system 250 to mobile electronics device 140. Message 254 includes an indication of the security key codes generated by computing system 250. In some examples, the security codes include any of one or more device codes to unlock basic operational functionality of one or more LED based lighting devices, one or more network codes that allow one or more LED based illumination devices to connect to a lighting control network (e.g., lighting control network 10), and one or more application codes to enable application services to run on one or more LED based illumination devices. Exemplary application services include data acquisition and analysis functions, lighting control functions, etc.

In some examples, the generation of security key codes by computing system 250 is contingent on additional communications between building management system 400 and computing system 250. For example, authentication of building management system 400 may be required. In another example, a financial transaction enabled by communication between building management system 400 and computing system 250 may be required before security keys are generated.

Figure 8:
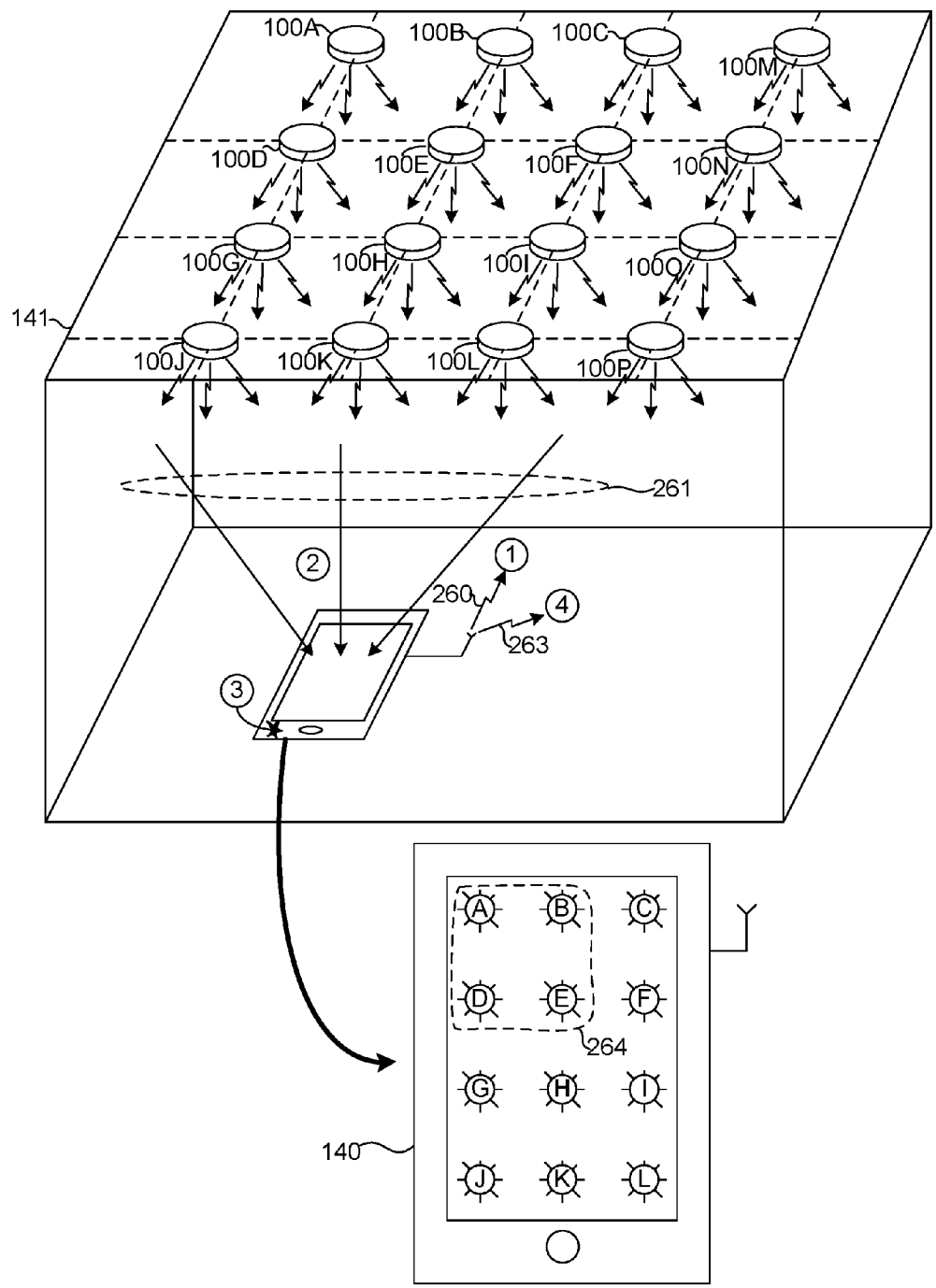
FIG. 8 depicts an environment illuminated by LED based illumination devices with a lighting control and communications gateway to bridge communications between a lighting control network and a building management network.

FIG. 8 depicts an environment 141 illuminated by LED based illumination devices 100A-P. In addition, LED based illumination device 100A includes a LCCG 40 to bridge communications between a lighting control network and a building management network. The lighting control network includes LED based illumination devices 100A-P and mobile electronics device 140. The building management network includes LED based illumination device 100A and building management system 400. Mobile electronics device 140 (e.g., mobile phone, tablet computer, etc.) includes a camera module and associated software to identify the presence of LED based illumination devices 100A-P including LCCG 40 within environment 141.

Although the authentication functionality, proximity functionality, and authorization functionality described with reference to FIGS. 4-7 was illustrated with reference to an individual LED based illumination device, in general, these functionalities may be applied to multiple LED based illumination devices in a sequential manner. For example, mobile electronics device 140 may be configured to participate in authentication, proximity, and authorization tasks with any of LED based illumination devices 100A-P.

In another aspect, mobile communication device 140 is configured to measure the relative strength of radio communication signals received from surrounding LED based illumination devices. In one example, mobile communication device 140 broadcasts a message requesting that all LED based illumination devices that receive the message transmit a response message to the mobile communications device 140 indicating their identity. In response, each LED based illumination device transmits a message to mobile electronics device 140 indicating its identity. Mobile electronics device 140 receives each of these messages and creates a list of identified LED based illumination devices along with a ranking of the identified LED based illumination devices. The ranking is based on an indication of the relative strength of the received RF signals. Exemplary indications of relative strength of the radio signals include received signal strength indicator (RSSI) data, time of flight data, packet loss data, hop count data, etc.

In another aspect, mobile communications device 140 is configured to detect light emitted from a number of LED based illumination devices and rank the LED based illumination devices based on the detected intensities or frequencies. In a further aspect, mobile communications device 140 determines a group of LED based illumination devices based on the intensity ranking.

In one example, mobile communication device 140 broadcasts a message identifying a sequence of specific LED based illumination devices (e.g., identified by serial number, device identification number, etc.). Each identified LED based illumination device receives the message and modulates its light output for a period of time. In some examples, the light emitted is dimmed from full intensity to a reduced intensity over a period of time (e.g., dim to 10% intensity over 0.1 seconds). In some other examples, the light emitted is varied in intensity at a fixed frequency for a period of time, e.g., where each identified LED based illumination device varies the intensity with a different fixed frequency. Mobile electronics device 140 detects the intensity of light captured by an imaging or non-imaging sensor of mobile electronics device 140 while the output of each of the LED based illumination devices is modulated. Mobile electronics device 140 associates the identity of each LED based illumination device with a corresponding intensity or frequency reading. Mobile electronics device 140 ranks the identified LED based illumination devices based on the detected intensities or frequencies. In one embodiment, mobile electronics device 140 determines a group of LED based illumination devices based on the relative values. For example, mobile electronics device 140 may determine a group of five lights to include LED based illumination devices that have the greatest impact on detected intensity. A message may be communicated to these LED based illumination devices indicating that they are members of a particular lighting group.

In another aspect, mobile communications device 140 is configured to capture a sequence of images (e.g., a video) while light emitted from a number of LED based illumination devices is sequentially modulated. The location of each LED based illumination device in the captured sequence of images is correlated with an electronic identity of each LED based illumination device. In a further aspect, mobile communications device 140 determines a group of LED based illumination devices based on the location of each LED based illumination device in the captured sequence of images.

In a step 1, mobile communication device 140 broadcasts a message 260 identifying a sequence of specific LED based illumination devices (e.g., identified by serial number, device identification number, etc.). Each identified LED based illumination device receives the message and modulates its light output for a period of time. In some examples, the light emitted is dimmed from full intensity to a reduced intensity over a period of time (e.g., dim to 10% intensity over 0.1 seconds). In some other examples, the light emitted is varied in intensity at a fixed frequency for a period of time, where the fixed frequency may be different for each identified LED based illumination device. In a step 2, mobile electronics device 140 detects a sequence of images that captures the light 261 emitted from each of the LED based illumination devices while their output is modulated. In a step 3, mobile electronics device 140 associates the identity of each LED based illumination device with a corresponding position in the sequence of images. The corresponding position is the location in the sequence of images where modulated light emission from the identified LED based illumination device appears in the image. For example, LED based illumination devices 100A-L are identified in particular locations on the sequence of images displayed on the screen of mobile electronics device 140. In one embodiment, mobile electronics device 140 determines a group of LED based illumination devices based on the sequence of images. For example, mobile electronics device 140 may determine a group of lights 264 to include LED based illumination devices A, B, D, and E. In a step 4, a message 263 is communicated from mobile electronics device 140 to LED based illumination devices 100A, 100B, 100D, and 100E indicating that they are members of a particular lighting group.

In another example, mobile electronics device 140 may determine the nearest neighbors of a particular LED based illumination device. For example, mobile electronics device 140 determines that LED based illumination devices 100D, 100E, 100F, 100I, 100L, 100K, 100J, and 100G are nearest to LED based illumination device 100H. In turn, mobile electronics device 140 transmits a message to LED based illumination device 100H listing these neighboring devices.

Figure 16:
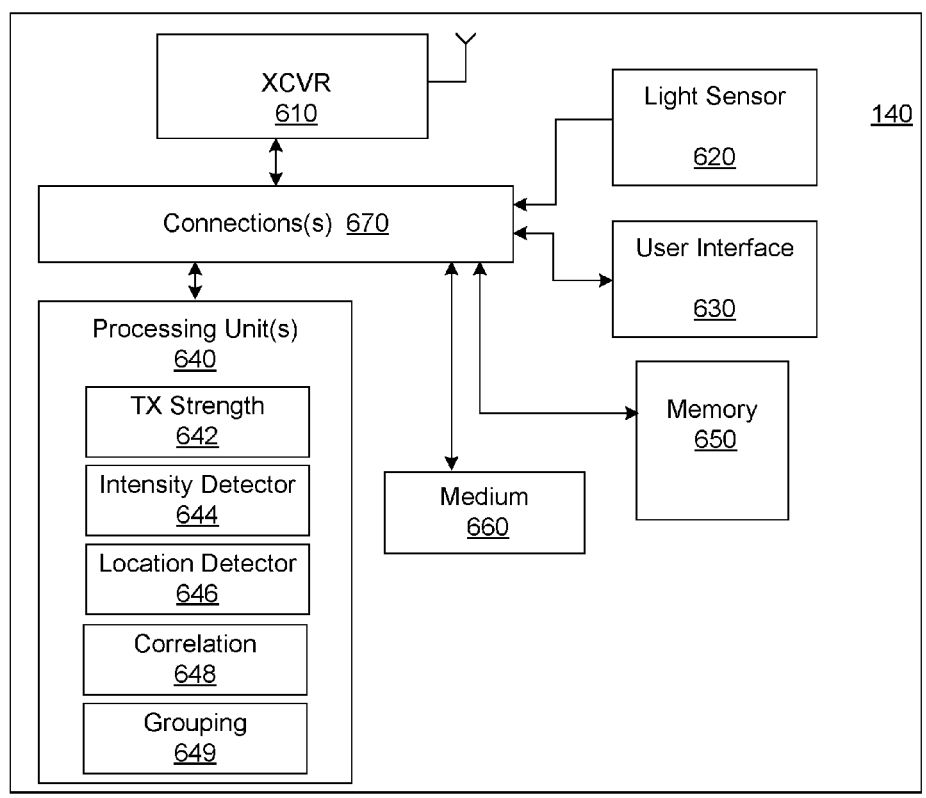
FIG. 16 depicts an exemplary mobile electronics device capable of commissioning of LED based illumination devices in a lighting control network as part of a group.

FIG. 16 depicts an exemplary mobile electronics device 140 depicted in FIG. 8 and capable of commissioning of LED based illumination devices in a lighting control network as part of a group. Mobile electronics device 140 may be, e.g., a mobile phone, tablet computer, etc. The mobile electronics device 140 includes a radio frequency transceiver 610 capable of communicating signals with other LED based illumination devices in the lighting control network. In one example, the radio frequency transceiver 610 may be a short range radio subsystem that complies with the IEEE 802.15.4 standard. In another example, the radio frequency transceiver 610 may be a radio subsystem that complies with the Bluetooth Low Energy standard. Other types of radio frequency communication may be used as well. The radio frequency transceiver 610 is configured to transmit or receive an amount of data from a LED based illumination devices in the lighting control network. As illustrated, the mobile electronics device 140 additionally, includes a light detector 620, which may be an imaging sensor, such as a camera, or a non-imaging sensor, and a user interface 630 that may include e.g., a display, a keypad or other input device, such as virtual keypad on the display, through which a user may interface with the mobile electronics device 140. Mobile electronics device 140 may, for example, include one or more processing units 640, memory 650, and a non-transitory computer-readable medium 660. The one or more processing units 642, memory 650, and a non-transitory computer-readable medium 660, as well as the transceiver 610, camera 620 and user interface 630 may be operatively coupled with one or more connections 670 (e.g., buses, lines, fibers, links, etc.). In certain example implementations, all or part of mobile electronics device 140 may take the form of a chipset, and/or the like.

The one or more processing units 640 may be implemented using a combination of hardware, firmware, and software. For example, processing unit 640 may be configured to perform the functions discussed herein by implementing one or more instructions or program code on the non-transitory computer-readable medium, such as medium 660 and/or memory 650. In some embodiments, the one or more processing unit 640 may represent one or more circuits configurable to perform at least a portion of a data signal computing procedure or process related to the operation of the mobile electronics device 140. For example, in some embodiments, the one or more processing unit 640 may be configured to include transmission strength (TX Strength) 642 detector to measure the relative strength of radio communication signals received from surrounding LED based illumination devices. By way of example, exemplary indications of relative strength of the radio signals that may be measured include received signal strength indicator (RSSI), time of flight, packet loss, hop count, etc.

The one or more processing unit 640 may be configured to include an intensity detector 644 to detect the intensity of light and/or the frequency of modulation of the light from the LED based illumination devices as received by the light sensor 620. For example, the intensity detector 644 may detect the intensity of light or the frequency of the modulation of the light as the LED based illumination devices modulate the light.

The one or more processing unit 640 may be configured to include a location detector 646 to determine the location of the LED based illumination devices, e.g., based on where the LED based illumination devices appear in a sequence of images (e.g., a video) as the LED based illumination devices sequentially modulate the emitted light.

The one or more processing unit 640 may be configured to include correlation module 648 that correlates one or more of the relative strength of the received RF signals (e.g., from TX strength 642), the intensity or frequency of modulation of the light (e.g., from intensity detector 644), and/or the locations of the imaged LED based illumination devices (e.g., from location detector 646) with the identifiers of the LED based illumination devices as received by the transceiver 610. The correlation module 648 may rank the LED based illumination devices, e.g., based on the relative strength of the received RF signals or the intensity reading.

The one or more processing unit 640 may be configured to include a grouping module 649 that receives the correlations from the correlation module 648 and determines a group of LED based illumination devices based on the relative strength of the received RF signals, the intensity or frequency readings, and/or the locations of the imaged LED based illumination devices. The grouping module 649 may cause the transceiver 610 to communicate to LED based illumination devices indicating that they are members of a particular lighting group.

Figure 9:
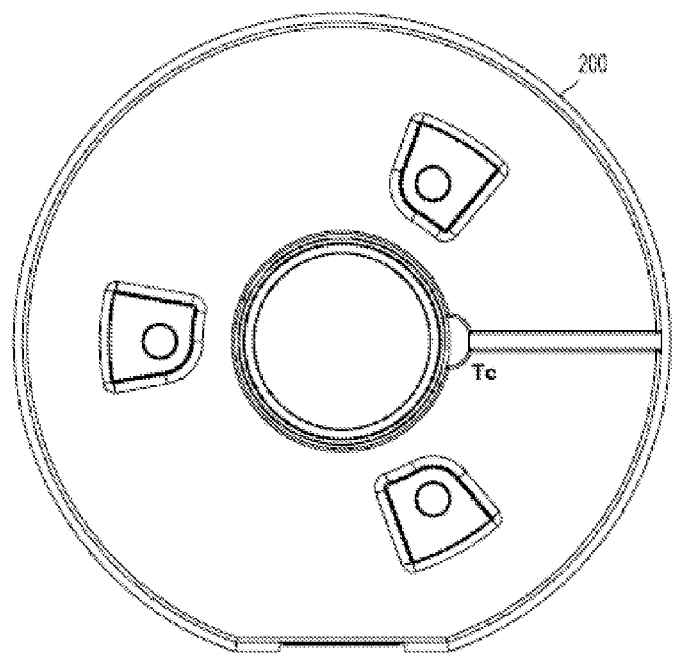
FIGS. 9 and 10 depict a top view and a side view, respectively, of an LED based illumination device including a LCDIM.
Figure 10:
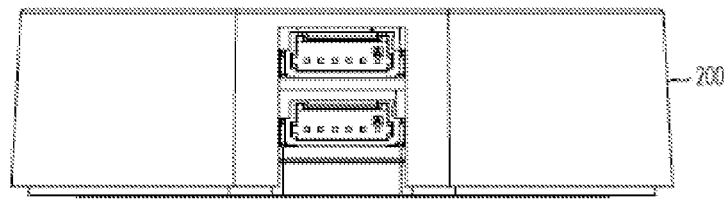

FIGS. 9 and 10 depict a top view and a side view, respectively, of an LED based illumination device 200 including a LCDIM. An example of such a lighting device is the Xicato Intelligent Module (XIM) manufactured by Xicato, Inc., San Jose, Calif. (USA).

Figure 11:
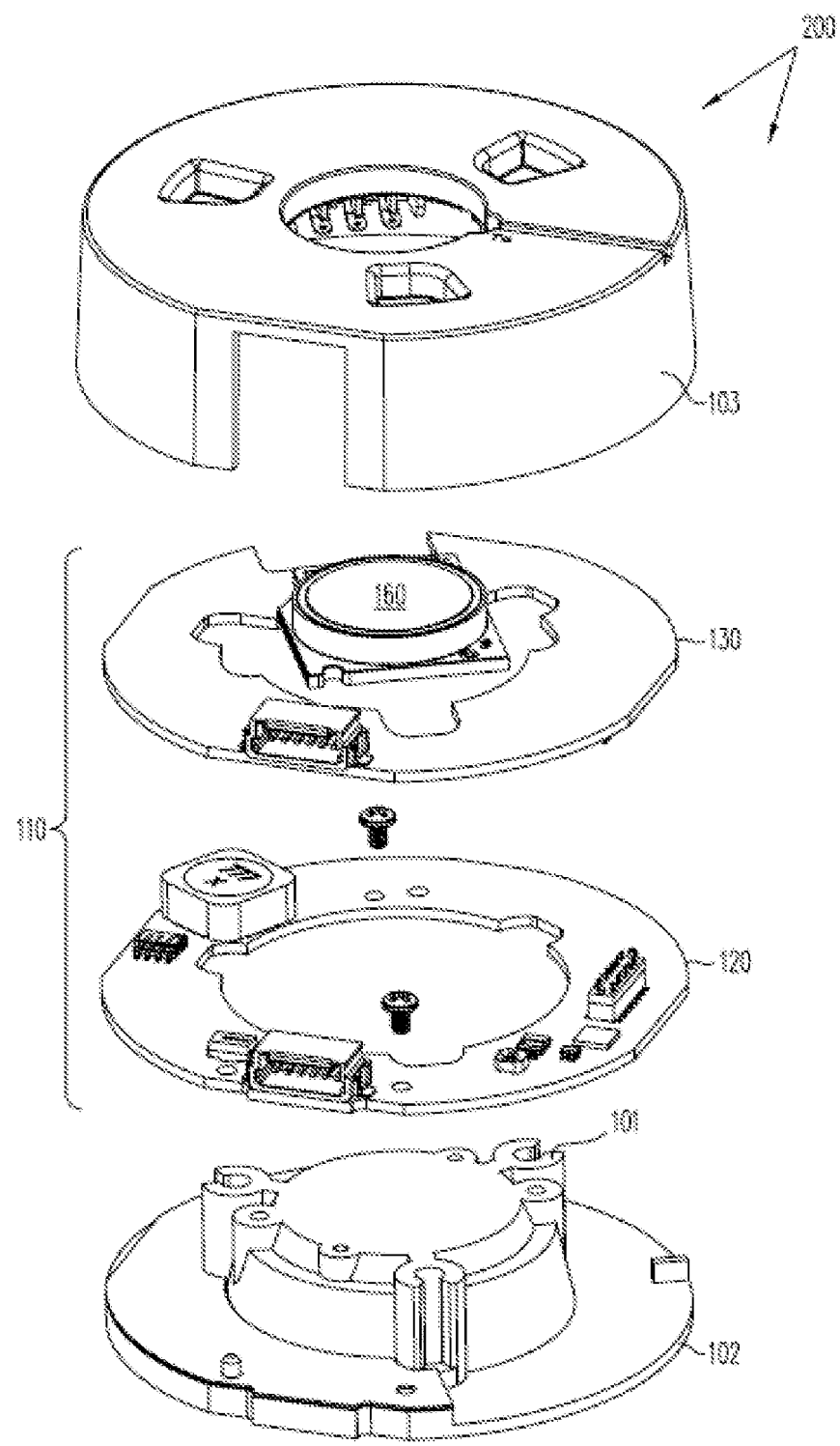
FIG. 11 depicts an exploded view illustrating components of LED based illumination device as depicted in FIG. 2.

FIG. 11 depicts an exploded view illustrating components of LED based illumination device 200 as depicted in FIG. 2. As depicted in FIG. 11, LED based illumination device 200 includes LED based light engine 160, LCDIM 110, including primary ECB 120 and peripheral ECB 130, heat sink 101, mounting plate 102, and housing 103.

The assembled LED based illumination device 200 mechanically integrates the LED based light engine 160 with the LCDIM within a common housing. However, in general, one or more components of LED based illumination device 200 may be mechanically separated from the others. In these embodiments, one or more components may be separately located on a light fixture and electrically coupled to the other components by suitable wiring and connectors. In some embodiments, LED based light engine 160 is assembled within a simple housing to facilitate attachment to a heat sink. An example of such a lighting device is the Xicato Thin Module (XTM) manufactured by Xicato, Inc., San Jose, Calif. (USA). In this example, one or more components of LCDIM 110 are packaged in a separate housing, and this assembly is electrically coupled to the LED based light engine by a wired connection.

It should be understood that as defined herein an LED based illumination device is not an LED, but is an LED light source or fixture or component part of an LED light source or fixture. As depicted in FIGS. 9-11, LED based illumination device 200 includes an LED based light engine 160 configured to generate an amount of light. LED based light engine 160 is coupled to heat sink 101 to promote heat extraction from LED based light engine 160. Primary ECB 120 and peripheral ECB 130 are shaped to fit around heat sink 101. LED based light engine 160, primary ECB 120, peripheral ECB 130, and heat sink 101 are enclosed between mounting plate 102 and housing 103. An optional reflector retainer (not shown) is coupled to housing 103. The reflector retainer is configured to facilitate attachment of different reflectors to the LED based illumination device 200.

In some embodiments, it is advantageous to separate the electronic functionality of LCDIM 110 across two or more electrical circuit boards, as depicted in FIG. 7, to minimize logistical complexity. For example, in a network of LED based illumination devices, certain devices may include different functionality than others. Common functionality is included on the primary ECB associated with each device. In this manner each manufactured device includes the same primary ECB. However, differing functionality is included in a different peripheral ECB. In this manner, one of more different devices may include different peripheral ECBs. Many different configurations may be contemplated. In general, the electronic functionality of LCDIM 110 as described herein may be distributed across any number of components in any suitable manner.

In the embodiment depicted in FIG. 2, LED driver 121 is configured to supply power to one or more LEDs of the LED based light engine 160 over a wired connection 124 between LCDIM 110 and LED based light engine 160. In one embodiment, LED driver 121 is a direct current to direct current (DC/DC) power converter. The DC/DC power converter receives electrical power signals 111 (e.g., 48 Volt supply voltage) supplied to LCDIM 110. The electrical power signals 111 are processed by the DC/DC power converter to generate current signals 125 supplied to the LEDs of LED based light engine 160. In some other embodiments, LED driver 121 is configured as an AC/DC power converter configured to convert AC input power signals to DC current signals supplied to the LEDs of LED based light engine 160. In some other embodiments, LED driver 121 is configured as an AC/AC power converter configured to convert AC input power signals to AC current signals supplied to the LEDs of LED based light engine 160 (e.g., when LED based light engine 160 includes AC LEDs).

In another aspect, LCDIM 110 includes a power converter 123 configured to supply low voltage electrical power signals to the components of LCDIM 110. In this manner, electrical power signals 111 can be used to supply electrical power to LED driver 121 and electrical power to the low voltage components of LCDIM 110 after power conversion by power converter 123. In some embodiments, power converter 123 is a DC/DC power converter that steps down the voltage of electrical power signals 111 to a low voltage range (e.g., less than five volts) suitable for powering the electronic circuitry of LCDIM 110.

LCDIM 110 includes a wireless communications interface to a lighting control network. In some embodiments the wireless communications interface is configured to transmit and receive communications signals 138. The wireless communications interface includes a wireless transceiver 129 operable in accordance with a wireless communications protocol (e.g., BLE), and one or more associated antennas 136 mounted to LED based illumination device 100.

In some embodiments, one or more antennas are mounted to the external facing surface(s) of LED based illumination device 100 to maximize communication efficiency between LED based illumination device 100 and a remotely located communications device (e.g., another LED based illumination device, a sensor module, a mobile phone, a router, or other digital system). In some embodiments, an antenna is integrated into the peripheral ECB 130. In some other embodiments, the antenna is integrated into the primary ECB 120. In some other embodiments, the antenna is integrated into housing 103, for example, by molding the antenna into the housing structure or attaching the antenna to a surface of the housing structure. In some other embodiments, the antenna is integrated into the mounting board of the LED based light engine 160.

As depicted in FIG. 2, LCDIM 110 includes an internal communications bus 128 coupled to various components including processor 122, memory 126, timer 127, power converter 123, transceiver 129, and LED driver 121.

In a further aspect, memory 126 stores identification data, operational data such as temperature history, current history, etc. For example, an identification number, a network security key, commissioning information, etc. may be stored on memory 126.

In some embodiments, communication of lighting control and status information involves a lighting control and communications gateway (LCCG) 40 depicted in FIG. 3. The LCCG 40 may be present on-board an LED based illumination device (e.g., LED based illumination device 100A), or may be arranged separately.

In some examples, LCCG 40 communicates data generated by LED based illumination devices 100A-C, and attached sensors, to a building management system.

In a further aspect, the amount of data communicated between LCCG 40 and building management system 400 is reduced by caching data associated with each LED based illumination device 100A-H on LCCG 40 for ready access by the building management system 400. In this manner, each request for data from the building management system 400 does not require a communication with each individual LED based illumination device to obtain the desired data. In some examples, LCCG 40 is configured to respond to a request for data by the building management system 400 based on cached data stored on LCCG 40 without having to initiate additional communications with other LED based illumination devices (e.g., LED based illumination devices 100A-H.

In some embodiments, any number of parameters associated with one or more LED based illumination devices in lighting control network 10 are communicated to LCCG 40 using BLE packet structures. The parameters are stored in a memory of LCCG 40.

By way of non-limiting example, information communicated from each LED based illumination device to LCCG 40 may include any of: a voltage supplied to one or more LEDs of the LED based illumination device, a current supplied to the one or more LEDs of the LED based illumination device, an electrical power consumed by the LED based illumination device, a temperature of the LED based illumination device, a time when the LED based illumination device transitions from an active state to an inactive state, and a time when the LED based illumination device transitions from an inactive state to an active state.

Status information communicated from each LED based illumination device to LCCG 40 is stored in memory 126 of LCCG 40 for several purposes. In one example, the status information is stored for rapid access and response to a request for status information by a building management system 400. For example, LCCG 40 is configured to receive a request for information associated with an LED based illumination device from the building management system 400. LCCG 40 is configured to determine a response to the request based on data stored in the memory of LCCG 40 and transmit the response to the building management system 400. For example, the temperature of LED based illumination device 100B is periodically reported to LCCG 40 over lighting control network 10 and stored in a memory of LCCG 40. At a point in time, a request 43 to report the temperature of LED based illumination device 100B is received by LCCG 40 from building management system 400. In response, LCCG 40 reads out the latest temperature value stored in memory and communicates this value to building management system 400.

In another example, status information stored on LCCG 40 is rapidly communicated to the building management system 400 without specific request. For example, at a point in time LCCG 40 receives a shutdown flag from LED based illumination device 100B followed by an error code. The error code is stored in a memory of LCCG 40. However, in addition, LCCG 40 rapidly communicates the error code to building management system 400 for logging and reporting purposes. By way of non-limiting example, an error code is indicative of any of an operating temperature exceeding a threshold value, an operating voltage exceeding a threshold value, an operating voltage below a threshold value, an operating current exceeding a threshold value, an operating current below a threshold value.

In yet another example, the status information is stored on LCCG 40 for further processing to generate summary status values based on the stored status information. For example, the total amount of time that the LED based illumination device 100B has been in an active state may be computed based on the times between transitions from an inactive state to an active state and transitions from an active state to an inactive state. For example, both shutdown and restart events are reported to LCCG 40 by LED based illumination device 100B over the lighting control network 10. LCCG 40 includes a real time clock 44 and is configured to associate the current time with each of the reported shutdown and restart events and store these times in memory. Thus, the times associated with transitions from an inactive state to an active state and transitions from an active state to an inactive state are stored in a memory of LCCG 40. At a point in time, LCCG 40 receives a request to report the total run time of LED based illumination device 100B from building management system 400. In response, LCCG 40 is configured to compute and report the total amount of time that the LED based illumination device 100B has been in an active state based on the times between transitions from an inactive state to an active state and transitions from an active state to an inactive state that are stored in memory 126.

In a further aspect, LCCG 40 is configured to assign a plurality of internet protocol addresses each associated with a plurality of LED based illumination devices coupled to the lighting control network. In this manner, from the perspective of a device operating on the building management network, each LED based illumination device coupled to the lighting control network appears directly visible and accessible. However, in reality, all requests for information associated with a particular LED based illumination device are received by LCCG 40 and responses to these requests are generated based, either directly or indirectly, on status information cached in memory 126 of LCCG 40.

In another aspect, a real time clock is maintained on LCCG 40 and the date and time are periodically transmitted to each LED based illumination device on the lighting control network. The real time clock is configured to maintain a current date and time of day, and is periodically synchronized with a time server accessible, for example, through the building management system 400. In addition, the current date and time of day maintained by LCCG 40 are periodically communicated to each LED based illumination device on the lighting control network. In particular, the current date and time of day is communicated to a LED based illumination device in response to receiving a message from the LED based illumination device indicating that the LED based illumination device has transitioned from an inactive state to an active state. In other words, when the LED based illumination device transitions from a powered down state, the current date and time of day are reported to the LED based illumination device so that the device can track its operation in real time.

In some examples, each LED based illumination device on the lighting control network reports the time and date associated with a transition from an active state to an inactive state, such as a shutdown event, or an error event to LCCG 40. LCCG 40 stores this time and date in memory. LCCG 40 may report the stored time and date back to each respective LED based illumination device in the lighting control network upon restart or clearing of the error event. In this manner, each LED based illumination device may determine the amount of time it was in an "off" state based on the recalled time and date and the current time and date reported by LCCG 40.

Figure 12:
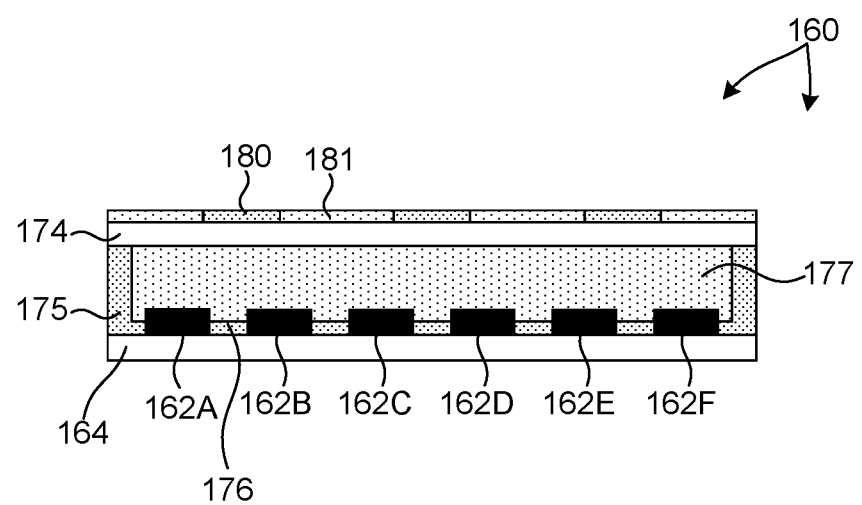
FIG. 12 illustrates a cross-sectional view of an LED based light engine.

FIG. 12 is illustrative of LED based light engine 160 in one embodiment. LED based light engine 160 includes one or more LED die or packaged LEDs and a mounting board to which LED die or packaged LEDs are attached. In addition, LED based light engine 160 includes one or more transmissive elements (e.g., windows or sidewalls) coated or impregnated with one or more wavelength converting materials to achieve light emission at a desired color point.

As illustrated in FIG. 12, LED based light engine 160 includes a number of LEDs 162A-F mounted to mounting board 164 in a chip on board (COB) configuration. The spaces between each LED are filled with a reflective material 176 (e.g., a white silicone material). In addition, a dam of reflective material 175 surrounds the LEDs 162 and supports transmissive element 174, sometimes referred to as a transmissive plate. The space between LEDs 162 and transmissive element 174 is filled with an encapsulating optically translucent material 177 (e.g., silicone) to promote light extraction from LEDs 162 and to separate LEDs 162 from the environment. In the depicted embodiment, the dam of reflective material 175 is both the thermally conductive structure that conducts heat from transmissive plate 174 to LED mounting board 164 and the optically reflective structure that reflects incident light from LEDs 162 toward transmissive plate 174.

LEDs 162 can emit different or the same colors, either by direct emission or by phosphor conversion, e.g., where phosphor layers are applied to the LEDs as part of the LED package. The illumination device 100 may use any combination of colored LEDs 162, such as red, green, blue, ultraviolet, amber, or cyan, or the LEDs 162 may all produce the same color light. Some or all of the LEDs 162 may produce white light. In addition, the LEDs 162 may emit polarized light or non-polarized light and LED based illumination device 100 may use any combination of polarized or non-polarized LEDs. In some embodiments, LEDs 162 emit either blue or UV light because of the efficiency of LEDs emitting in these wavelength ranges. The light emitted from the illumination device 100 has a desired color when LEDs 162 are used in combination with wavelength converting materials on transmissive plate 174, for example. By tuning the chemical and/or physical (such as thickness and concentration) properties of the wavelength converting materials and the geometric properties of the coatings on the surface of transmissive plate 174, specific color properties of light output by LED based illumination device 100 may be specified, e.g., color point, color temperature, and color rendering index (CRI).

For purposes of this patent document, a wavelength converting material is any single chemical compound or mixture of different chemical compounds that performs a color conversion function, e.g., absorbs an amount of light of one peak wavelength, and in response, emits an amount of light at another peak wavelength.

By way of example, phosphors may be chosen from the set denoted by the following chemical formulas: $Y_3Al_5O_{12}$:Ce, (also known as YAG:Ce, or simply YAG) $(Y,Gd)_3Al_5O_{12}$:Ce, CaS:Eu, SrS:Eu, $SrGa_2S_4$:Eu, $Ca_3(Sc,Mg)_2Si_3O_{12}$:Ce, $Ca_3Sc_2Si_3O_{12}$:Ce, $Ca_3Sc_2O_4$:Ce, $Ba_3Si_6O_{12}N_2$:Eu, (Sr,Ca)$AlSiN_3$:Eu, $CaAlSiN_3$:Eu, $CaAlSi(ON)_3$:Eu, $Ba_2SiO_4$:Eu, $Sr_2SiO_4$:Eu, $Ca_2SiO_4$:Eu, $CaSc_2O_4$:Ce, $CaSi_2O_2N_2$:Eu, $SrSi_2O_2N_2$:Eu, $BaSi_2O_2N_2$:Eu, $Ca_5(PO_4)_3$Cl:Eu, $Ba_5(PO_4)_3$Cl:Eu, $Cs_2CaP_2O_7$, $Cs_2SrP_2O_7$, $Lu_3Al_5O_{12}$:Ce, $Ca_8Mg(SiO_4)_4Cl_2$:Eu, $Sr_8Mg(SiO_4)_4Cl_2$:Eu, $La_3Si_6N_{11}$:Ce, $Y_3Ga_5O_{12}$:Ce, $Gd_3Ga_5O_{12}$:Ce, $Tb_3Al_5O_{12}$:Ce, $Tb_3Ga_5O_{12}$:Ce, and $Lu_3Ga_5O_{12}$:Ce.

In one example, the adjustment of color point of the illumination device may be accomplished by adding or removing wavelength converting material from transmissive plate 174. In one embodiment a red emitting phosphor 181 such as an alkaline earth oxy silicon nitride covers a portion of transmissive plate 174, and a yellow emitting phosphor 180 such as a YAG phosphor covers another portion of transmissive plate 174.

In some embodiments, the phosphors are mixed in a suitable solvent medium with a binder and, optionally, a surfactant and a plasticizer. The resulting mixture is deposited by any of spraying, screen printing, blade coating, jetting, or other suitable means. By choosing the shape and height of the transmissive plate 174, and selecting which portions of transmissive plate 174 will be covered with a particular phosphor or not, and by optimization of the layer thickness and concentration of a phosphor layer on the surfaces, the color point of the light emitted from the device can be tuned as desired.

In one example, a single type of wavelength converting material may be patterned on a portion of transmissive plate 174. By way of example, a red emitting phosphor 181 may be patterned on different areas of the transmissive plate 174 and a yellow emitting phosphor 180 may be patterned on other areas of transmissive plate 174. In some examples, the areas may be physically separated from one another. In some other examples, the areas may be adjacent to one another. The coverage and/or concentrations of the phosphors may be varied to produce different color temperatures. It should be understood that the coverage area of the red and/or the concentrations of the red and yellow phosphors will need to vary to produce the desired color temperatures if the light produced by the LEDs 162 varies. The color performance of the LEDs 162, red phosphor and the yellow phosphor may be measured and modified by any of adding or removing phosphor material based on performance so that the final assembled product produces the desired color temperature.

Transmissive plate 174 may be constructed from a suitable optically transmissive material (e.g., sapphire, quartz, alumina, crown glass, polycarbonate, and other plastics). Transmissive plate 174 is spaced above the light emitting surface of LEDs 162 by a clearance distance. In some embodiments, this is desirable to allow clearance for wire bond connections from the LED package submount to the active area of the LED. In some embodiments, a clearance of one millimeter or less is desirable to allow clearance for wire bond connections. In some other embodiments, a clearance of two hundred microns or less is desirable to enhance light extraction from the LEDs 162.

In some other embodiments, the clearance distance may be determined by the size of the LED 162. For example, the size of the LED 162 may be characterized by the length dimension of any side of a single, square shaped active die area. In some other examples, the size of the LED 162 may be characterized by the length dimension of any side of a rectangular shaped active die area. Some LEDs 162 include many active die areas (e.g., LED arrays). In these examples, the size of the LED 162 may be characterized by either the size of any individual die or by the size of the entire array. In some embodiments, the clearance should be less than the size of the LED 162. In some embodiments, the clearance should be less than twenty percent of the size of the LED 162. In some embodiments, the clearance should be less than five percent of the size of the LED. As the clearance is reduced, light extraction efficiency may be improved, but output beam uniformity may also degrade.

In some other embodiments, it is desirable to attach transmissive plate 174 directly to the surface of the LED 162. In this manner, the direct thermal contact between transmissive plate 174 and LEDs 162 promotes heat dissipation from LEDs 162. In some other embodiments, the space between mounting board 164 and transmissive plate 174 may be filled with a solid encapsulate material. By way of example, silicone may be used to fill the space. In some other embodiments, the space may be filled with a fluid to promote heat extraction from LEDs 162.

In the embodiment illustrated in FIG. 12, the surface of patterned transmissive plate 174 facing LEDs 162 is coupled to LEDs 162 by an amount of flexible, optically translucent material 177. By way of non-limiting example, the flexible, optically translucent material 177 may include an adhesive, an optically clear silicone, a silicone loaded with reflective particles (e.g., titanium dioxide (TiO2), zinc oxide (ZnO), and barium sulfate (BaSO4) particles, or a combination of these materials), a silicone loaded with a wavelength converting material (e.g., phosphor particles), a sintered PTFE material, etc. Such material may be applied to couple transmissive plate 174 to LEDs 162 in any of the embodiments described herein.

In some embodiments, multiple, stacked transmissive layers are employed. Each transmissive layer includes different wavelength converting materials. For example, a transmissive layer including a wavelength converting material may be placed over another transmissive layer including a different wavelength converting material. In this manner, the color point of light emitted from LED based illumination device 100 may be tuned by replacing the different transmissive layers independently to achieve a desired color point. In some embodiments, the different transmissive layers may be placed in contact with each other to promote light extraction. In some other embodiments, the different transmissive layers may be separated by a distance to promote cooling of the transmissive layers. For example, airflow may by introduced through the space to cool the transmissive layers.

The mounting board 164 provides electrical connections to the attached LEDs 162 to a power supply (not shown). In one embodiment, the LEDs 162 are packaged LEDs, such as the Luxeon Rebel manufactured by Philips Lumileds Lighting. Other types of packaged LEDs may also be used, such as those manufactured by OSRAM (Ostar package), Luminus Devices (USA), Cree (USA), Nichia (Japan), or Tridonic (Austria). As defined herein, a packaged LED is an assembly of one or more LED die that contains electrical connections, such as wire bond connections or stud bumps, and possibly includes an optical element and thermal, mechanical, and electrical interfaces. The LEDs 162 may include a lens over the LED chips. Alternatively, LEDs without a lens may be used. LEDs without lenses may include protective layers, which may include phosphors. The phosphors can be applied as a dispersion in a binder, or applied as a separate plate. Each LED 162 includes at least one LED chip or die, which may be mounted on a submount. The LED chip typically has a size about 1 mm by 1 mm by 0.5 mm, but these dimensions may vary. In some embodiments, the LEDs 162 may include multiple chips. The multiple chips can emit light similar or different colors, e.g., red, green, and blue. The LEDs 162 may emit polarized light or non-polarized light and LED based illumination device 100 may use any combination of polarized or non-polarized LEDs. In some embodiments, LEDs 162 emit either blue or UV light because of the efficiency of LEDs emitting in these wavelength ranges. In addition, different phosphor layers may be applied on different chips on the same submount. The submount may be ceramic or other appropriate material. The submount typically includes electrical contact pads on a bottom surface that are coupled to contacts on the mounting board 164. Alternatively, electrical bond wires may be used to electrically connect the chips to a mounting board. Along with electrical contact pads, the LEDs 162 may include thermal contact areas on the bottom surface of the submount through which heat generated by the LED chips can be extracted. The thermal contact areas are coupled to heat spreading layers on the mounting board 164. Heat spreading layers may be disposed on any of the top, bottom, or intermediate layers of mounting board 164. Heat spreading layers may be connected by vias that connect any of the top, bottom, and intermediate heat spreading layers.

In some embodiments, the mounting board 164 conducts heat generated by the LEDs 162 to the sides of the board 164 and the bottom of the board 164. In one example, the bottom of mounting board 164 may be thermally coupled to a heat sink, or a lighting fixture and/or other mechanisms to dissipate the heat, such as a fan. In some embodiments, the mounting board 164 conducts heat to a heat sink thermally coupled to the top of the board 164. Mounting board 164 may be an FR4 board, e.g., that is 0.5 mm thick, with relatively thick copper layers, e.g., 30 micrometers to 100 micrometers, on the top and bottom surfaces that serve as thermal contact areas. In other examples, the board 164 may be a metal core printed circuit board (PCB) or a ceramic submount with appropriate electrical connections. Other types of boards may be used, such as those made of alumina (aluminum oxide in ceramic form), or aluminum nitride (also in ceramic form).

Mounting board 164 includes electrical pads to which the electrical pads on the LEDs 162 are connected. The electrical pads are electrically connected by a metal, e.g., copper, trace to a contact, to which a wire, bridge or other external electrical source is connected. In some embodiments, the electrical pads may be vias through the board 164 and the electrical connection is made on the opposite side, i.e., the bottom, of the board. Mounting board 164, as illustrated, is rectangular in dimension. LEDs 162 mounted to mounting board 164 may be arranged in different configurations on rectangular mounting board 164. In one example LEDs 162 are aligned in rows extending in the length dimension and in columns extending in the width dimension of mounting board 164. In another example, LEDs 162 are arranged in a hexagonally closely packed structure. In such an arrangement each LED is equidistant from each of its immediate neighbors. Such an arrangement is desirable to increase the uniformity and efficiency of emitted light.

Figure 13:
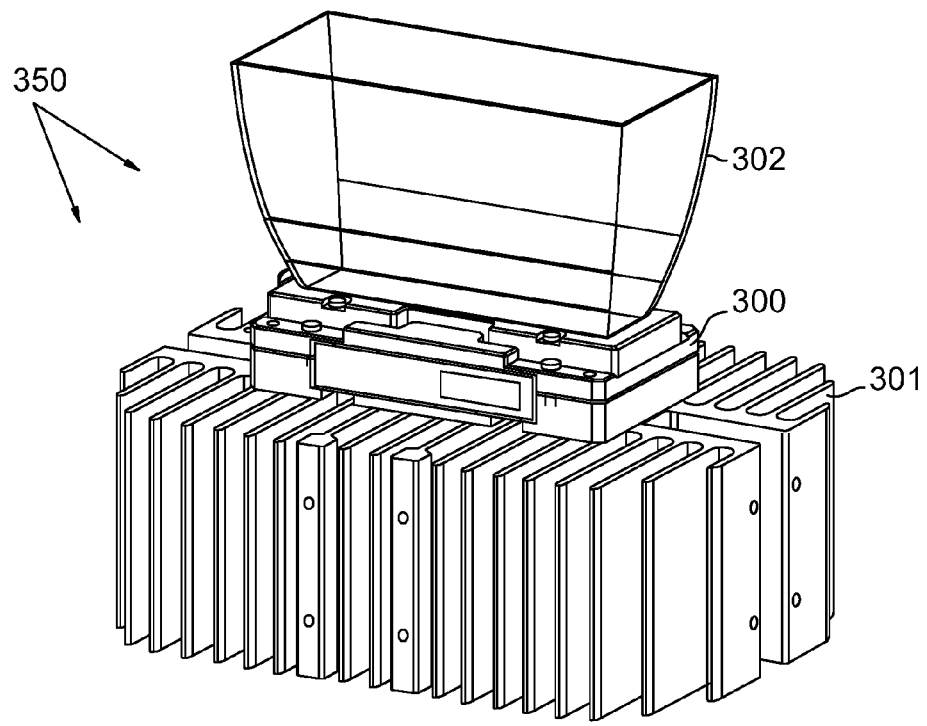
FIG. 13 depicts a perspective view of a luminaire including an LED based illumination device with a rectangular form factor.
Figure 14:
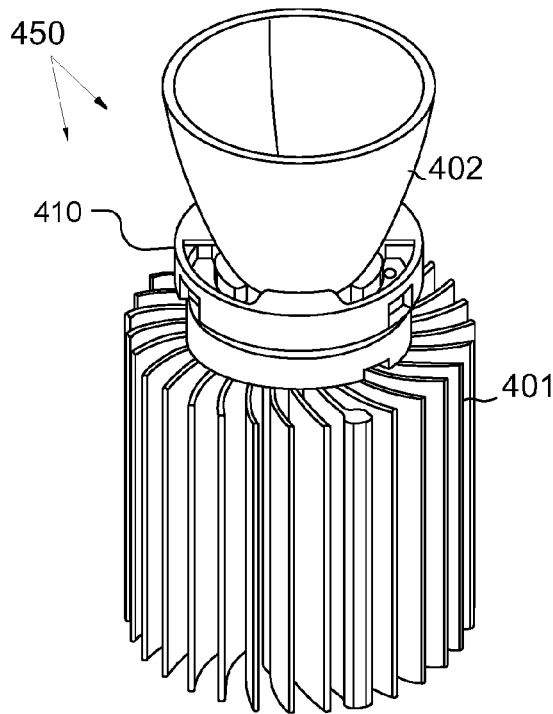
FIG. 14 depicts a perspective view of a luminaire including an LED based illumination device with a circular form factor.
Figure 15:
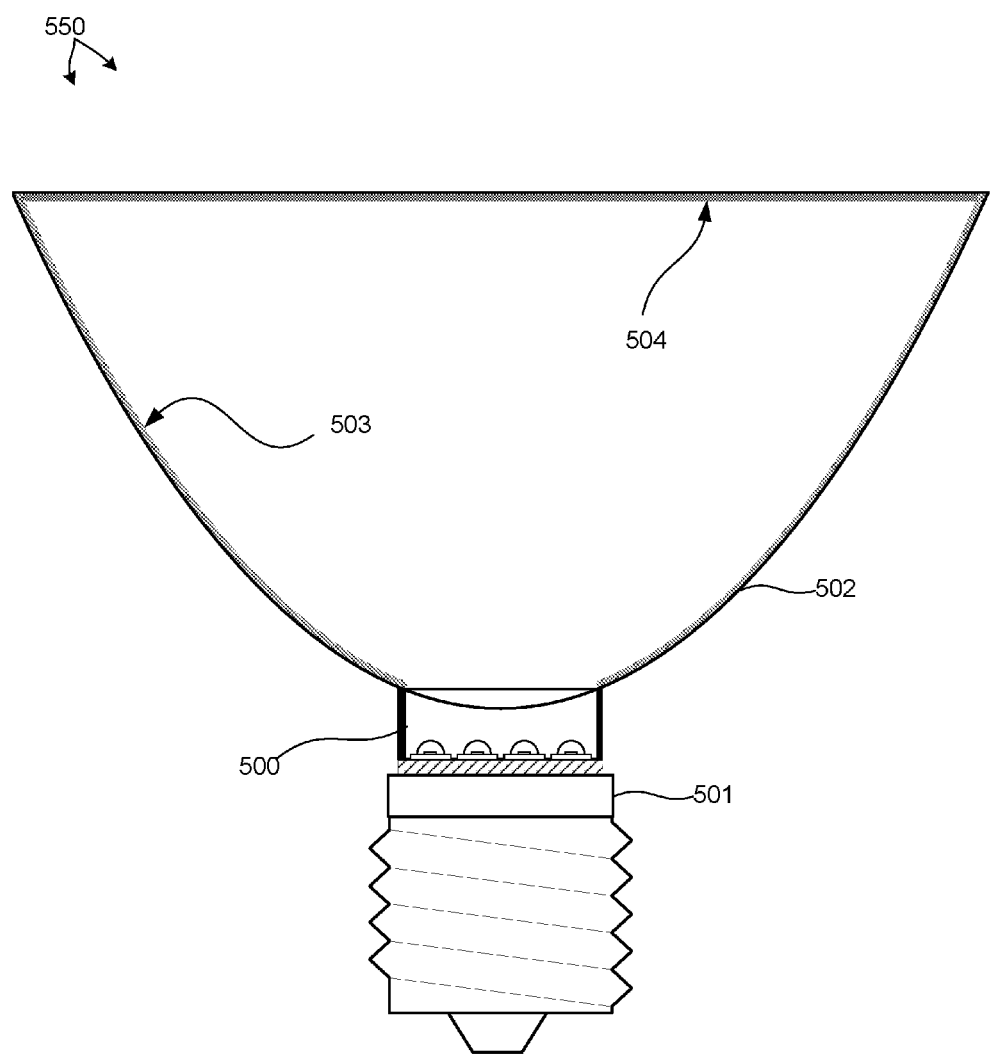
FIG. 15 depicts a side view of a luminaire including an LED based illumination device integrated into a retrofit lamp device.

FIGS. 13, 14, and 15 illustrate three exemplary luminaires. Luminaire 350 illustrated in FIG. 9 includes an illumination module 300 with a rectangular form factor. The luminaire 450 illustrated in FIG. 10 includes an illumination module 410 with a circular form factor. The luminaire 550 illustrated in FIG. 11 includes an illumination module 500 integrated into a retrofit lamp device. These examples are for illustrative purposes. Examples of illumination modules of general polygonal and elliptical shapes may also be contemplated.

Luminaires 350, 450, and 550 include illumination modules 300, 410, and 500, reflectors 302, 402, and 502, and light fixtures 301, 401, and 501, respectively. As depicted, the light fixtures include a heat sink capability, and therefore may be sometimes referred to as a heat sink. However, the light fixtures may include other structural and decorative elements (not shown). The reflectors are mounted to the illumination modules to collimate or deflect light emitted from each illumination module. Reflectors may be made from a thermally conductive material, such as a material that includes aluminum or copper and may be thermally coupled to each illumination module. Heat flows by conduction through the illumination module and the thermally conductive reflector. Heat also flows via thermal convection over the reflector. Reflectors may be compound parabolic concentrators, where the concentrator is constructed of or coated with a highly reflecting material. Optical elements, such as a diffuser or reflector may be removably coupled to an illumination module, e.g., by means of threads, a clamp, a twist-lock mechanism, or other appropriate arrangement. As illustrated in FIG. 13, the reflector 502 may include sidewalls 503 and a window 504 that are optionally coated, e.g., with a wavelength converting material, diffusing material or any other desired material.

As depicted in FIGS. 13, 14, and 15, the illumination module is mounted to a heat sink. The heat sink may be made from a thermally conductive material, such as a material that includes aluminum or copper and may be thermally coupled to an illumination module. Heat flows by conduction through an illumination module and the thermally conductive heat sink. Heat also flows via thermal convection over the heat sink. Each illumination module may be attached to a heat sink by way of screw threads to clamp the illumination module to the heat sink. To facilitate easy removal and replacement, the illumination module may be removably coupled to the heat sink, e.g., by means of a clamp mechanism, a twist-lock mechanism, or other appropriate arrangement. The illumination module includes at least one thermally conductive surface that is thermally coupled to the heat sink, e.g., directly or using thermal grease, thermal tape, thermal pads, or thermal epoxy. For adequate cooling of the LEDs, a thermal contact area of at least 50 square millimeters, but preferably 100 square millimeters should be used per one watt of electrical energy flow into the LEDs on the board. For example, in the case when 20 LEDs are used, a 1000 to 2000 square millimeter heatsink contact area should be used. Using a larger heat sink may permit the LEDs to be driven at higher power, and also allows for different heat sink designs. For example, some designs may exhibit a cooling capacity that is less dependent on the orientation of the heat sink. In addition, fans or other solutions for forced cooling may be used to remove the heat from the device. The bottom heat sink may include an aperture so that electrical connections can be made to the illumination module.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:
1. A method of grouping LED based illumination sources on a lighting communications network, comprising:
   determining a plurality of identities, each associated with a different LED based illumination device on the lighting communications network;

communicating a request to each identified LED based illumination device to modulate a light emitted from each of the LED based illumination devices for a period of time;
detecting modulated light emitted from each LED based illumination device; and
determining a group of the LED based illumination devices based on the detected modulated light and the identities of the LED based illumination devices.

2. The method of claim 1, wherein determining the plurality of identities comprises:
broadcasting a request that any LED based illumination device that receives the request transmits a response providing its identity; and
receiving responses with the plurality of identities for a plurality of LED based illumination devices.

3. The method of claim 1, wherein the request to modulate the light emitted from each of the LED based illumination devices for the period of time comprises one of a request to dim the light over the period of time or a request for a variation in intensity at a fixed frequency for the period of time.

4. The method of claim 1, further comprising communicating a message to the LED based illumination devices in the group indicating that they are members of the group.

5. The method of claim 1, wherein detecting the modulated light emitted from each LED based illumination device comprises detecting an intensity or frequency of the modulated light emitted from each LED based illumination device, the method further comprising:
associating an identity of each identified LED based illumination devices with each detected intensity;
wherein determining the group of the LED based illumination devices based on the detected modulated light and the identities of the LED based illumination devices comprises determining the group of the LED based illumination devices based on the identities of the LED based illumination devices and associated detected intensities or frequencies.

6. The method of claim 5, wherein the modulated light emitted from each LED based illumination device is detected with an imaging or non-imaging sensor.

7. The method of claim 5, wherein determining the group of the LED based illumination devices based on the identities of the LED based illumination devices and the associated detected intensities or frequencies uses relative values.

8. The method of claim 1, wherein detecting the modulated light emitted from each LED based illumination device comprises detecting a sequence of images of the modulated light emitted from each LED based illumination device, the method further comprising:
determining a location of each identified LED based illumination device in the sequence of images; and
associating an identity of each identified LED based illumination devices with each corresponding determined location in the sequence of images;
wherein determining the group of the LED based illumination devices based on the detected modulated light and the identities of the LED based illumination devices comprises determining the group of the LED based illumination devices based on the associated identity and the location of each of the LED based illumination devices.

9. The method of claim 8, wherein determining the group of the LED based illumination devices based on the associated identity and the location of each of the LED based illumination devices comprises determining neighboring LED based illumination devices of a particular LED based illumination device and forming the group with the particular LED based illumination device and its neighboring LED based illumination devices.

10. A mobile electronic device, comprising:
a radio frequency transceiver;
a light detector; and
one or more processors configured to:
determine a plurality of identities, each associated with a different LED based illumination device on a lighting communications network, based on one or more signals received by the radio frequency transceiver;
communicate a request to each identified LED based illumination device with the radio frequency transceiver to modulate a light emitted from each of the LED based illumination devices for a period of time;
detect with the light detector modulated light emitted from each LED based illumination device; and
determine a group of the LED based illumination devices based on the detected modulated light and the identities of the LED based illumination devices.

11. The mobile electronic device of claim 10, wherein the one or more processors is configured to determine the plurality of identities by being configured to:
broadcast with the radio frequency transceiver a request that any LED based illumination device that receives the request transmits a response providing its identity; and
receive with the radio frequency transceiver responses with the plurality of identities for a plurality of LED based illumination devices.

12. The mobile electronic device of claim 11, wherein the request to modulate the light emitted from each of the LED based illumination devices for the period of time comprises one of a request to dim the light over the period of time or a request for a variation in intensity at a fixed frequency for the period of time.

13. The mobile electronic device of claim 10, wherein the one or more processors is further configured to cause the radio frequency transceiver to communicate a message to the LED based illumination devices in the group indicating that they are members of the group.

14. The mobile electronic device of claim 10, wherein the one or more processors is configured to detect the modulated light emitted from each LED based illumination device by being configured to detect an intensity or frequency of the modulated light emitted from each LED based illumination device, the one or more processors is further configured to:
associate an identity of each identified LED based illumination devices with each detected intensity or frequency;
wherein the one or more processors is configured to determine the group of the LED based illumination devices based on the detected modulated light and the identities of the LED based illumination devices by being configured to determine the group of the LED based illumination devices based on the identities of the LED based illumination devices and associated detected intensities or frequencies.

15. The mobile electronic device of claim 14, wherein the light detector comprises one of an imaging sensor or a non-imaging sensor.

16. The mobile electronic device of claim 14, wherein the one or more processors is configured to determine the group of the LED based illumination devices based on the identities of the LED based illumination devices and the associated detected intensities or frequencies by using relative values.

17. The mobile electronic device of claim 10, wherein the one or more processors is configured to detect the modulated light emitted from each LED based illumination device by being configured to detect a sequence of images of the modulated light emitted from each LED based illumination device, the one or more processors is further configured to:
   determine a location of each identified LED based illumination device in the sequence of images; and
   associate an identity of each identified LED based illumination devices with each corresponding determined location in the sequence of images;
   wherein the one or more processors is configured to determine the group of the LED based illumination devices based on the detected modulated light and the identities of the LED based illumination devices by being configured to determine the group of the LED based illumination devices based on the associated identity and the location of each of the LED based illumination devices.

18. The mobile electronic device of claim 17, wherein the one or more processors is configured to determine the group of the LED based illumination devices based on the associated identity and the location of each of the LED based illumination devices by being configured to determine neighboring LED based illumination devices of a particular LED based illumination device and forming the group with the particular LED based illumination device and its neighboring LED based illumination devices.

\* \* \* \* \*